Figure 1:
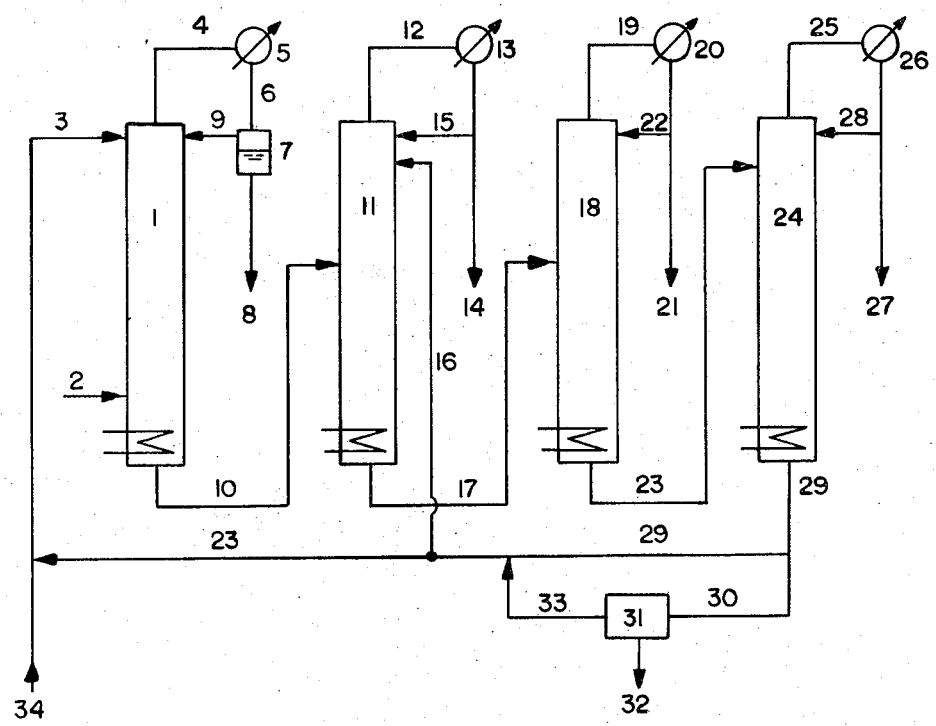

United States Patent [19]
Willersinn et al.

[11] 3,844,903
[45] Oct. 29, 1974

[54] SEPARATING ALPHA, BETA-UNSATURATED CARBOXYLIC ACIDS FROM AQUEOUS SOLUTIONS BY AZEOTROPIC DISTILLATION WITH EXCESS SOLVENT

[75] Inventors: Carl-Heinz Willersinn; Franz Reicheneder, both of Ludwigshafen, Germany

[73] Assignee: Badische Anilin & Soda-Fabrik Aktiengesellschaft, Ludwigshafen/Rhine, Germany

[22] Filed: Apr. 27, 1972

[21] Appl. No.: 248,169

[30] Foreign Application Priority Data
Apr. 29, 1971  Germany............................ 2121123

[52] U.S. Cl.................. 203/51, 203/15, 203/60, 203/61, 203/63, 203/69, 203/DIG. 21, 203/84, 260/526 N
[51] Int. Cl........................ B01d 3/36, C07c 57/04
[58] Field of Search............. 203/15, 84, 61, 60, 69, 203/63, 51, DIG. 21, 16, 14; 260/526 N

[56] References Cited
UNITED STATES PATENTS

| | | |
|---|---|---|
| 3,470,238 | 9/1969 | Asano et al..................... 260/526 N |
| 3,527,677 | 9/1970 | Harpring.............................. 203/15 |
| 3,534,091 | 10/1970 | Hartel et al..................... 260/526 N |
| 3,555,082 | 1/1971 | Sennewald et al............. 260/526 N |
| 3,657,332 | 4/1972 | Sennewald et al.................... 203/15 |

OTHER PUBLICATIONS
Technique of Organic Chemistry: Vol. IV, Distillation Weissberger (Interscience Publ., N.Y., 1951) pp. 382–384.

Primary Examiner—Wilbur L. Bascomb, Jr.
Attorney, Agent, or Firm—Johnston, Keil Thompson & Shurtlefe

[57] ABSTRACT

$\alpha,\beta$-Unsaturated carboxylic acids which have been prepared by catalytic oxidation of the corresponding olefins bearing terminal double bonds or the corresponding $\alpha,\beta$-unsaturated aldehydes with oxygen or oxygen-containing gases, and by-products formed in this reaction may be removed from their aqueous solutions by azeotropic distillation using hydrophobic solvents which boil at higher temperatures than the carboxylic acids and which do not form azeotropes with the substances to be separated, provided that an organic solvent boiling at a higher temperature than all of the products to be removed by distillation is added in a quantity which is in excess of that required for the azeotropic removal of the water.

12 Claims, 2 Drawing Figures

SEPARATING ALPHA, BETA-UNSATURATED CARBOXYLIC ACIDS FROM AQUEOUS SOLUTIONS BY AZEOTROPIC DISTILLATION WITH EXCESS SOLVENT

This invention relates to a method of separating carboxylic acids which have been prepared by oxidation of olefins having terminal double bonds or by oxidation of the aldehyde formed from said olefins by oxidation, which method involves azeotropic dehydration.

The invention more specifically relates to a method of isolating acetic acid, acrylic acid and maleic acid from the aqueous solutions and of separating these products from each other.

Various methods of isolating, say, acrylic acid from its aqueous solution are already known. Thus it has been proposed, for example, to extract the mixture with organic solvents such as ethyl acetate or ethyl acrylate, distill off the solvent and water from the extract and separate the acetic acid from the acrylic acid in the residue by fractional distillation. Due to the unfavorable partition coefficient of maleic acid, the residue contains only about 60 to 70 percent by weight of the maleic acid originally contained in the aqueous solution. The remaining maleic acid is lost with the raffinate during extraction.

The fractional distillation of a mixture of acetic acid and acrylic acid requires a column having a large number of theoretical trays and a high reflux ratio. According to German Published Application No. 1,950,750, a mixture containing 10 parts of acrylic acid and 1 part of acetic acid must be distilled in a column having 55 theoretical trays and a reflux ratio of 15:1, in order to separate these components. Not only does this method involve considerable losses due to the formation of so-called diacrylic acid according to the following equation:

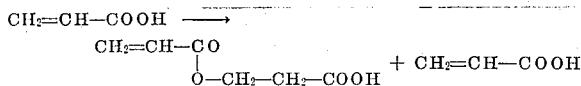

but it is also not possible, according to our own experiments, to sufficiently suppress the polymerization of acrylic acid. Such a column cannot be operated for long periods due to the frequent trouble incurred by said polymerization. Further, the acrylic acid obtained in the bottoms must be purified by redistillation in order to remove the resulting diacrylic acid, maleic acid and polyacrylic acids. It has been proposed to overcome these difficulties by washing the ethyl acetate extract with water to remove the acetic acid and then to distill off the ethyl acetate giving an acrylic acid which is almost free of acetic acid but which is obtained in a yield of only 54 percent according to the Example given in U.K. Pat. No. 997,325.

According to German Printed Application No. 1,942,338 the same method is employed and the acrylic acid yield is improved by using as solvent for example isophorone or 3,3,5-trimethylcyclohexanone, but there is still the drawback that acetic acid and maleic acid are subsequently present in aqueous solution in even lower concentrations than before the isolation of the acrylic acid. Furthermore, the solvents used in this method serve as washing agents and not as liquid aids for azeotropic distillation.

German Printed Application No. 1,950,750 further proposes a method of separating the acetic acid from the acrylic acid by subjecting the aqueous solution of acrylic acid to azeotropic distillation with butyl acetate or one of a number of other solvents. This method also provides acetic acid at the top of the column merely in the form of a dilute aqueous solution which has to be concentrated by some other expensive procedure.

The method described in the last reference does not teach how aqueous solutions also containing maleic acid have to be worked up. Since all prior art catalysts used for the oxidation of propylene produce maleic acid as by-product in addition to acrylic acid and acetic acid, the acrylic acid isolated according to German Printed Application No. 1,950,750 is contaminated with the entire amount of maleic acid contained in the aqueous solution. This maleic acid and the diacrylic acid formed in the separation of acetic acid consequently have to be separated by distillation in a further column.

Finally, according to German Printed Application No. 1,568,937, acrylic acid is recovered from the reaction gases resulting from the oxidation of propylene by washing with high-boiling solvents. However, the method proposed by this printed application also provides only a mixture of acrylic acid and acetic acid which still contains 30 parts of water for every 100 parts of acrylic acid. Thus in addition to the difficult separation of acetic acid it is necessary to remove the water.

The problem of separating unsaturated acids and the by-products from water in a simple and economical manner has therefore not yet been solved satisfactorily.

It is an object of the present invention to overcome the above difficulties and obviate said disadvantages. This is achieved in the method of the invention which makes it possible to isolate, in succession, for example acetic acid, acrylic acid and maleic acid (as the anhydride) in a concentrated form from an aqueous solution. The method is also suitable for separating each of said acids individually or any other lower carboxylic acid as a single component in concentrated form from aqueous solutions.

Our method of separating $\alpha,\beta$-unsaturated carboxylic acids which have been prepared by catalytic oxidation of the corresponding olefins bearing a terminal double bond or of the $\alpha,\beta$-unsaturated aldehydes formed as intermediates, with oxygen or oxgen-containing gases, and of separating by-products formed during this reaction, from aqueous solutions of said $\alpha,\beta$-unsaturated carboxylic acids or by-products by azeotropic distillation with hydrophobic solvents boiling at higher temperatures than the carboxylic acids and not forming azeotropes with the substances to be separated is characterized in that an organic solvent which boils at a higher temperature than all of the products to be removed by distillation is added in a quantity which is greater than that necessary for the azeotropic removal of the water.

In our new method the water content of the aqueous solutions of $\alpha,\beta$-olefinically unsaturated carboxylic acids, in particular of $\alpha,\beta$-olefinically unsaturated monocarboxylic acids containing three or four carbon atoms, and above all acrylic acid, may vary within wide limits. It is usually between 20 and 80 percent by weight of water based on the total aqueous solution, and the novel separating method is of particular interest for water contents of from 40 to 80 percent by weight. the content of the unsaturated dicarboxylic acids, particularly maleic acid, is usually low and is frequently between 1 and 5 percent by weight based on the total aqueous solution. The content of $\alpha,\beta$-olefinically unsaturated monocarboxylic acids in the aqueous solutions is usually between 10 and 80 percent and in particular between 15 and 60 percent by weight of the total aqueous solution.

The method of the invention is suitable for unsaturated carboxylic acids, of which acrylic acid and methacrylic acid are typical examples, provided they have been prepared by oxidation with oxygen in the presence of catalysts or by oxidation of the unsaturated aldehydes which form as intermediates in this reaction. The execution of this oxidation reaction is described in a large number of patents and patent applications and in other relevant literature and requires no detailed explanation in this specification. These processes all have in common the fact that by-products are formed in addition to the unsaturated acids, these by-products including saturated carboxylic acids and maleic acid. In the production of acrylic acid the by-products formed are acetic acid and maleic acid. In this method, the maleic acid is converted to maleic anhydride during the working up process and is isolated as such.

The essential features of the method of the invention are that the water is separated azeotropically with a higher boiling solvent, to which end a definite amount of solvent is generally required when the composition of the mixture to be separated is known, that the solvent is added in excess, and that a solvent is selected whose boiling point is higher than that of all of the volatiles contained in the reaction mixture. Thus an excess of solvent is deliberately used in the knowledge that after the water has been removed the acrylic acid will by no means be present in a pure form but will be in the form of a mixture containing not only the said by-products formed in the oxidation reaction but also the said solvent. This technique has obviously never been considered in the art for these reasons. In conventional methods, it is essential to add an azeotrope-forming solvent to a high degree of accuracy. Such accurate metering is no longer necessary in the method of the invention, which means that tolerances in metering and in the associated equipment need be less stringent.

The novel method of separating acrylic acid or methacrylic acid by azeotropic distillation may be carried out in a wide range of pressures. The pressure is generally between atmospheric (760 mm of Hg) and a reduced pressure of from 50 to preferably 80 to 250 mm of Hg.

The method is illustrated below with reference to FIGS. 1 and 2 of the accompanying drawings exemplifying the separation of acrylic acid and its by-products as formed in the oxidation of propylene or the oxidation of acrolein.

Figure 2:
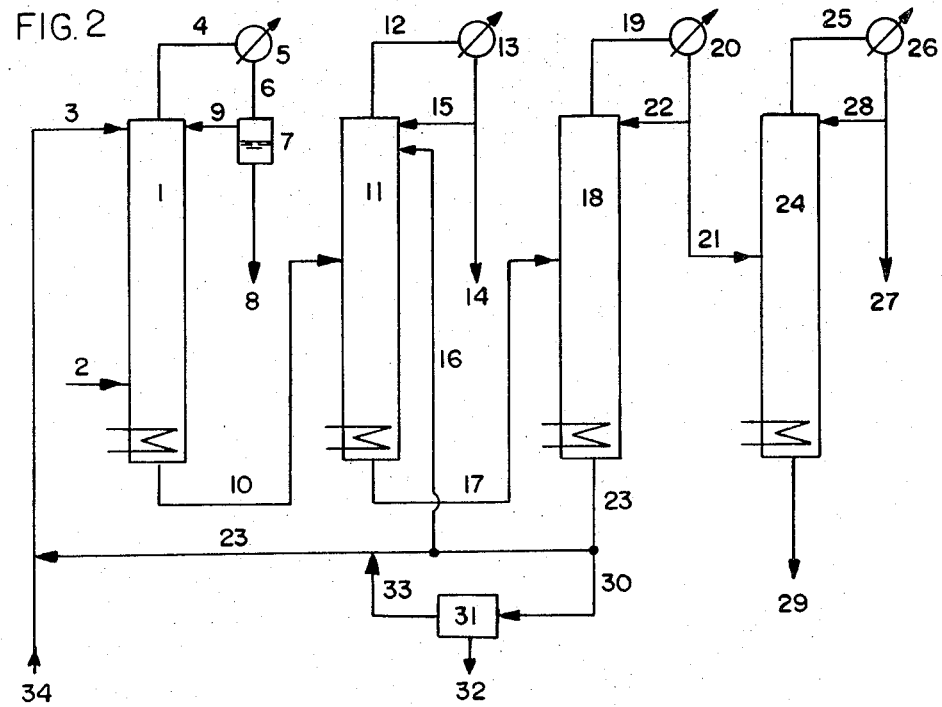

With reference to FIG. 1, the acrylic acid-containing solution may be passed through a line 2 to the bottom of a distillation column, while the solvent, which boils at a higher temperature than all of the reaction products including maleic anhydride, is fed to the top of the column through line 3 in a quantity which is greater than that necessary for the azeotropic removal of the water. The solvent preferably contains one of the conventional polymerization inhibitors for acrylic acid, e.g. hydroquinone, hydroquinone monomethyl ether, Methylene Blue or phenothiazine. The base of the column is heated, and water distills off azeotropically through line 4 to condense in the condenser 5. This water thus contains the high-boiling solvent in small amounts which are virtually negligible but which are necessary for the formation of the azeotrope. When the azeotrope separates into two phases on condensation, the condensate is passed through line 6 to the separating vessel 7, from which the aqueous phase is withdrawn through line 8 and the organic phase (the solvent) is recycled to the top of column 1 through line 9.

The solvent used may be any organic solvent provided it does not form an azeotrope with acrylic acid, acetic acid or maleic anhydride.

In general, the amount of solvent to be used is governed by the partition coefficient of acrylic acid, expressed as the ratio of the concentration of acrylic acid in solvent to the concentration of acrylic acid in water:

$$K = C_{solvent}/C_{water}.$$

If this partition coefficient of acrylic acid in a particular solvent is small, the amount of solvent used is greater than in the case of a solvent in which the arcylic acid has a high partition coefficient. In general, the amount of high-boiling organic solvent used in practice is between 100 and 5,000 times and preferably between 120 and 4,000 times the amount of said organic solvent which is necessary for the azeotropic removal of the water.

Suitable solvents which may be used in the invention for the removal of, say, acrylic acid or methacrylic acid from their aqueous solutions and which do not form azeotropes with the organic components, are high-boiling carboxylic acid nitriles such as adipic acid dinitrile, carboxylic acids such as 2-ethylhexanoic acid, difficulty saponifialde esters of carboxylic acids such as dimethyl and dibutyl phthalates, esters of phosphoric acid such as tributyl phosphate, high-boiling ethers which are incapable of forming peroxides such as diphenyl ether, and high-boiling hydrocarbons such as diphenyl. Mixtures of such high-boiling ethers with high-boiling hydrocarbons are also suitable, for example the commercially available, azeotropically boiling mixture of 73.5 percent of diphenyl ether and 26.5 percent of diphenyl. Such solvents should preferably boil under the conditions of the process at a temperature of at least 20° C higher than the highest boiling point of the products to be removed by distillation, and the boiling point of the solvent should not generally exceed 300° C and preferably not exceed 250° C under the conditions of the process. In the separation of acrylic acid which has been prepared by oxidizing propylene and/or acrolein with oxygen, the highest-boiling product to be removed by distillation is for example maleic anhydride which has a boiling point of 102° C at 25 mm of Hg. In this case, the high-boiling organic solvent added for the removal of acrylic acid is preferably one which boils at from 122° to 300° C at the same pressure, i.e., 25 mm of Hg. Maleic anhydride boils at 136° C. at 100 mm of Hg and suitable high-boiling organic solvents are generally those which boil at from 156° to 300° C and preferably from 156° to 250° C at 100 mm of Hg, when this pressure is used. The use of solvents having boiling points above 300° C under the conditions of the separation is technically possible but not to be recommended due to the large quantities of heat required to heat the mixture and to the heat losses which occur in the pipelines and also to the more expensive apparatus required.

Following the azeotropic removal of the water, the bottoms from column 1 pass through line 10 to column 11. Here, the acetic acid is distilled off through line 12 together with residual amounts of water, and is condensed in the condenser 13 and removed via line 14. A portion of the distillate is recycled to the column through line 15 in order to obtain a distillate of the desired concentration. The polymerization inhibitor-containing solvent is simultaneously passed to column 11 via line 16 at a point such that the height of the portion of the column above said point has an adequate separating action to prevent the solvent from distilling over direct. Due to the high boiling point of the solvent, only a few separating stages are necessary. The bottoms from column 11, which contain solvent, acrylic acid, maleic acid and the anhydride formed by partial dehydration of maleic acid, are fed through line 17 to column 18. The acrylic acid distills off through line 19, is condensed in condenser 20 and withdrawn via line 21. The refluxed portion is fed to column 18 via line 22.

The bottoms in column 18 consist of the solvent and maleic anhydride formed by the elimination of water from maleic acid under the conditions of distillation. These bottoms are passed through line 23 to column 24, in which the maleic anhydride distills off via line 25, is condensed in condenser 26 and withdrawn through line 27. The refluxed amount is passed to column 24 through line 28.

The solvent, now free from carboxylic acids, is withdrawn from column 24 through line 29 and cooled and re-used in column 1 to which it is fed through line 3. The heat given off during cooling may be utilized in the usual way in a heat exchanger for heating the aqueous acrylic acid fed to column 1 through line 2. Nondistillables, which may be suspended or dissolved in the solvent, are removed from the process by tapping off a portion of the solvent from line 29 through line 30 and separating said non-distillables therefrom in a separator 31 and withdrawing them through line 32. The separator 31 may be a filter, centrifuge or an evaporator with condenser, depending on whether the said non-distillables are suspended or dissolved in the solvent.

The purified solvent is then returned to the process through line 33. Lost solvent is made good through line 34.

In another embodiment (FIG. 2), acrylic acid and maleic anhydride may be distilled off together in column 18 through line 19, the vapors being condensed in a heat exchanger 20 and the condensed mixture being passed through line 21 to column 24 for further separation. The refluxed portion is fed to column 18 through line 22. In this case, the acid-free solvent collects at the base of column 18 and is withdrawn therefrom through line 23 to be returned to the top of column 1 through line 3. From column 24, acrylic acid is obtained through line 25, condenser 26 and line 27, whilst the maleic anhydride is removed as bottoms through line 29. The refluxed portion to column 24 flows through line 28.

A portion of the solvent is tapped off from line 23 through line 30 and separated in separator 31 — as in FIG. 1 — to remove the non-distillables, which are withdrawn through line 32. The purified solvent is returned to column 1 through lines 33, 23 and 3.

The invention is further illustrated by the following Examples in which the percentages are by weight.

EXAMPLE 1

17,390 g of an aqueous solution consisting of 74.52 percent of water, 19.7 percent of acrylic acid, 2.36 percent of acetic acid, 1.19 percent of maleic acid, 0.8 percent of formaldehyde, 2.23 percent of total carbonyl compounds (precipitated as dinitrophenylhydrazones and calculated as acrolein) and 660 ppm of hydroquinone are passed over 66 hours to the middle of column 1 having a height of 2,000 mm and a diameter of 42 mm and evacuated to a pressure of 100 mm of Hg. The column is packed with 5 × 5 mm rings of wire netting made of refined steel. At the same time, 39,075 g of dimethyl phthalate containing 0.5 percent of phenothiazine as inhibitor in solution are fed to the top of the column. The column base is heated to 95° to 96° C and distillation is carried out at 51° C. The composition of the azeotrope is 0.39 percent of dimethyl phthalate at 100 mm of Hg and 99.61 percent of water; the 39,075 g of dimethyl phthalate are 790 times the amount of this substance required for the separation of the water alone. The amount of water distilled off is 13,187 g, this containing 0.057 percent of acrylic acid, 0.03 percent of acetic acid and also 1 percent of formaldehyde, 2.18 percent of carbonyl compounds (assessed as above) and 0.34 percent of dimethyl phthalate. At the base of the column there is obtained a solution of acrylic acid, acetic acid and maleic acid containing 0.5 percent of water.

The latter solution is fed to the packed column 11 at a height of 1,000 mm, a further 6,200 g of stabilizer-containing dimethyl phthalate being passed to the packing at a height of 2,700 mm. Column 11 has a height of 3,000 mm and its diameter is 42 mm up to a height of 2,000 and 32 mm over the remainder of the column. 8,940 g of material is refluxed to the top of the column and there are obtained, at a base temperature of 125° C, an overhead temperature of 42° C and a pressure of 50 mm of Hg, 596 g of acetic acid having a concentration of 63 percent by weight. It also contains 0.93 percent of acrylic acid. The bottoms contain only traces of acetic acid.

This is separated in the packed column 18 having a height of 2,000 mm, a diameter of 42 mm and a pressure of 25 mm of Hg, the mixture being fed to the column at a height of 1,000 mm, to give, at a reflux ratio of 1:1, a base temperature of 173° C and an overhead temperature of 56° C, 3,418 g of an acrylic acid containing 99 percent of acrylic acid, 0.1 percent of acetic acid, 0.8 percent of water 0.1 percent of stabilizer and traces of maleic acid. This is equivalent to a yield of 98.8 percent.

The residue at the base of column 18 is then fed to the middle of the packed column 24 having a height of 1,000 mm and a diameter of 25 mm over the rectifying section and 42 mm over the stripping section, the pressure being 25 mm of Hg. There are obtained, at a base temperature of 176° C, an overhead temperature of 112.5° C and a reflux ratio of 3:1, 160 g of maleic anhydride in a concentration of 96.7 percent. This is equivalent to a yield of 88.8 percent based on the maleic acid present in the original solution. The maleic anhydride contains 3.1 percent of acrylic acid and 0.2 percent of dimethyl phthalate. The dimethyl phthalate substantially free from maleic anhydride is reused in columns 1 and 11.

EXAMPLE 2

31,100 g of an aqueous solution consisting of 43.73 percent of water, 44.5 percent of acrylic acid, 3.86 percent of acetic acid and 4.61 percent of maleic acid are fed over 116 hours to a point 1,000 mm up the packed column 11 having a total height of 3,000 mm and a diameter of 42 mm, the pressure being 100 mm of Hg and the packing consisting of 5 × 5 mm rings of wire netting made of refined steel, whilst 55,170 g of adipic acid dinitrile containing 0.5 percent of phenothiazine are simultaneously fed to the top of the column. At 100 mm of Hg, the azeotrope consists of 0.256 percent of adipic acid dinitrile and 99.744 percent of water. The 55,170 g of adipic acid dinitrile are thus 1,590 times the amount of said substance required for the separation of the water. The base of the column is heated at 110° C and the temperature at the top of the column is 50° C, this giving a distillate which separates into two phases on condensation. The organic phase is recycled to the column. The aqueous phase (14,568 g) contains 0.04 percent of acrylic acid and 0.013 percent of adipic acid dinitrile.

The adipic acid dinitrile and the acids and 0.09 percent of water dissolved therein are discharged from the base of the column and fed to the packed column 11 described in Example 1. A further 14,900 g of adipic acid dinitrile are simultaneously fed to this column at a height of 2,700 mm. At a base temperature of 109° C and a reflux ratio of 12:1 there are obtained 1,080 g of distillate which distills over at from 45° to 46° C. The distillate contains 92.45 percent of acetic and 1.5 percent of acrylic acid. This is equivalent to a yield of 83.1 percent based on the acetic acid present in the original solution.

The solution of acrylic acid in adipic acid dinitrile containing only traces of acetic acid is distilled in column 18 as described in Example 1, the reflux ratio being 1:1, the pressure 25 mm of Hg, the base temperature 179° to 180° C and the overhead temperature 53.5° C to give 13,790 g of acrylic acid containing 1.24 percent of water, 0.2 percent of acetic acid and 0.1 percent of stabilizer. This is equivalent to a yield of 98.1 percent based on the acrylic acid present in the original solution.

The bottoms from column 18 are further distilled in column 24 as described in Example 1. The reflux ratio is 3:1, the base temperature is 182° C, the overhead temperature is 98° C and the pressure is 25 mm of Hg, these conditions giving 978 g of maleic anhydride contaminated with 4.5 percent of acrylic acid and 0.1 percent of adipic acid dinitrile. This is equivalent to a yield of 77 percent of the maleic acid in the original solution.

EXAMPLE 3

9,460 g of the aqueous acrylic acid described in Example 2 are fed to column 1 as described in Example 2 over a period of 45 hours, whilst the solution simultaneously fed to the packing consists of 37,510 g of the azeotropically boiling mixture of 73.5 percent of diphenyl ether and 26.5 percent of diphenyl commercially available under the trade name "DIPHYL." (The composition of the azeotrope at 100 mm of Hg is 1.27 percent of DIPHYL and 98.73 percent of water; the amount of DIPHYL is 716 times that required to remove the water.) At a base temperature of 110° C and a pressure of 100 mm of Hg and an overhead temperature of 48° C there are obtained 4,435 g of an aqueous distillate containing 0.39 percent of acrylic acid, 0.41 percent of acetic acid, 0.15 percent of maleic acid and 0.02 percent of DIPHYL. A small amount of DIPHYL which separates as organic phase is recycled to the column. The bottoms contain 0.13 percent of water and are fed to column 11 as described in Example 1 at a height of 1,000 mm, whilst a further 5,010 g of DIPHYL are simultaneously fed at a height of 2,700 mm. At a pressure of 50 mm of Hg, a base temperature of 101.5° C, and overhead temperature of 42° C and reflux ratio of 11:1, 391 g of acetic acid (82.65 percent) containing 15.8 percent of water, 1.55 percent of acrylic acid and traces of DIPHYL distill over. This is equivalent to a yield of 88.5 percent based on the acetic acid present in the original solution.

The bottoms from column 11 are then pumped into column 18 as described in Example 1, at a height of 1,000 mm. The reflux ratio is 1:1, the pressure is 25 mm of Hg, the base temperature is 144° C and the overhead temperature is 53° C, to give 4,178 g of a 98.5 percent acrylic acid containing 0.29 percent of acetic acid, 0.09 percent of maleic acid, 1 percent of water and 0.1 percent of stabilizer. This is equivalent to a yield of 97.6 percent based on the acrylic acid present in the original solution.

The solvent from the base of column 18 is further distilled in column 24 as described in Example 1. At a pressure of 25 mm of Hg, a reflux ratio of 4:1, a base temperature of 146° C and an overhead temperature of 93.5° C, 289 g of 95.7 percent maleic anhydride contaminated with 3.9 percent of acrylic acid and 0.40 percent of DIPHYL distills over. This is equivalent to a yield of 75 percent on the maleic acid present in the original solution.

The recovered DIPHYL is recycled to the process.

EXAMPLE 4

20,400 g of an aqueous solution consisting of 44.57 percent of water, 45.7 percent of acrylic acid, 3.25 percent of acetic acid, 3.29 percent of maleic acid, 1.2 percent of formaldehyde, 3.19 percent of total carbonyl compounds (assessed as in Example 1) and 0.045 percent of hydroquinone are fed over 77 hours to the column 1 described in Example 2 at a height of 1,000 mm, whilst 40,145 g of di-n-butyl phthalate (containing 0.5 percent of phenothiazine) are fed to the packing at the top of the column. (The composition of the azeotrope at 100 mm of Hg is 0.13 percent of di-n-butyl phthalate and 99.87 percent of water, which means that the amount of phthalate is 3,470 times the amount required for the removal of the water.) At a pressure of 100 mm of Hg, a base temperature of 109° to 110° C and an overhead temperature of 52° C there distill 9,740 g of water, which on analysis is found to contain 0.08 percent of acrylic acid, 0.14 percent of acetic acid, 0.08 percent of maleic acid, 2.2 percent of formaldehyde, 4.22 percent of total carbonyl compounds and 0.013 percent of di-n-butyl phthalate. During condensation a small amount of organic phase separates, and this is removed and returned to the column. The bottoms contain 0.06 percent of water and are fed to the packed column 11 as described in Example 1 at a height of 1,000 mm, whilst a further 6,420 g of di-n-butyl phthalate are simultaneously added at a height of 2,700 mm. The base is heated at 102° C and the remaining water and the acetic acid are distilled off at a pressure of 50 mm of Hg. The reflux consists of 6,430 g of distillate returned to the top of the column and there are obtained, at an overhead temperature of 45.5° C, 643 g of a 92.75 percent acetic acid. This is equivalent to a yield of 90 percent on the acetic acid present in the original solution. This acetic acid contains 2.5 percent of acrylic acid.

The acrylic acid solution obtained as bottoms of column 11 is fed to column 18 as described in Example 1 at a height of 1,000 mm to give 9,285 g of acrylic acid having a purity of 98.5 percent, at a reflux ratio of 1:1, a pressure of 25 mm of Hg, a base temperature of 213° C and an overhead temperature of 56.5° C. The acrylic acid obtained contains 0.97 percent of water, 0.3 percent of acetic acid, 0.05 percent of maleic acid and 0.1 percent of stabilizer.

The di-n-butyl phthalate obtained as bottoms in column 18 is fed to column 24 as described in Example 1, in which the pressure is 25 mm of Hg, the reflux ratio is 2:1, the base temperature is 221° C and the overhead temperature is 98.8° C, to give 533 g of maleic anydride containing 92 percent of maleic anhydride, 7.96 percent of acrylic acid and 0.04 percent of di-n-butyl phthalate. This is equivalent to a yield of 86 percent based on the maleic acid contained in the original solution. The dibutyl phthalate withdrawn from the base is recycled to the process.

EXAMPLE 5

19,570 g of the acrylic acid solution described in Example 4 are fed over 37 hours to the column 1 described in Example 2 at a height of 1,000 mm. At the same time, 17,955 g of tri-n-butyl phosphate containing 0.5 percent of phenothiazine are fed to the top of the column. (The composition of the azeotrope at 100 mm of Hg is 0.31 percent of tri-n-butyl phosphate and 99.69 percent of water; the amount of tributyl phosphate used is thus 664 times that required for the removal of the water.) The base of the column is heated at a temperature of 115° C and distillation is carried out at an overhead temperature of 49° C and a pressure of 100 mm of Hg to give 9,280 g of water, which on analysis is found to contain 0.033 percent of acrylic acid, 1.7 percent of formaldehyde, 3.25 percent of total carbonyl compounds (assessed as in Example 1) and 0.034 percent of tri-n-butyl phosphate, no acetic acid or maleic acid being found. A small amount of tri-n-butyl phosphate separating as a distinct phase during condensation is removed and recycled to column 1. The bottoms from column 1, consisting of a solution of the acids in tributyl phosphate and containing 0.23 percent of water, are distilled in column 11 as described in Example 2. The solution is fed to the column at a height of 1,000 mm and a further 5,745 g of tri-n-butyl phosphate are added at a height of 2,700 mm. The column 11 is evacuated to a pressure of 50 mm of Hg and its base is heated at 106° to 107° C, distillation being carried out at an overhead temperature of 43° to 44° C. There are obtained as distillate 608 g of an 87.1 percent acetic acid at a reflux ratio of 12:1. The acetic acid contains 2.29 percent of acrylic acid. The remainder is water and carbonyl compounds, not quantitatively assessed.

The solution obtained as bottoms in column 11 and containing only traces of acetic acid is further treated in column 18 as described in Example 1. It is fed to the column at a height of 1,000 mm and distillation is carried out at a pressure of 25 mm of Hg, a reflux ratio of 1:1, a base temperature of 172° C and an overhead temperature of 54° C to give 8,860 g of acrylic acid containing 98.80 percent of acrylic acid, 0.94 percent of water, 0.1 percent of acetic acid, traces of maleic acid and 0.1 percent of stabilizer. This is equivalent to a yield of 97.9 percent based on the acrylic acid in the original solution.

The tributyl phosphate is removed from the base of column 18 and 487 g of maleic anhydride containing 5.95 percent of acrylic acid and 0.08 percent of tributyl phosphate are removed therefrom in column 24 as described in Example 1 at a pressure of 25 mm of Hg, a reflux ratio of 3:1, a base temperature of 181° C and an overhead temperature of 95° to 96° C. This is equivalent to a yield of 84 percent on the maleic acid in the original solution.

The tributyl phosphate withdrawn from the base of column 2 is recycled to the process.

EXAMPLE 6

21,100 g of the acrylic acid solution described in Example 2 are fed over 79 hours to the column 1 described in Example 2 at a height of 1,000 mm, which column is held at a pressure of 100 mm of Hg and a temperature of 110° C at its base. At the same time, 53,360 g of 2-ethylhexanoic acid containing 0.5 percent of phenothiazine are fed to the top of the column. At an overhead temperature of 50° C there are obtained 9,845 g of a distillate which is found to contain 0.31 percent of acrylic acid, 0.07 percent of acetic acid, 0.06 percent of maleic acid and 0.09 percent of 2-ethylhexanoic acid. (The formaldehyde and total carbonyls were not assessed.) The composition of the azeotrope is 0.75 percent of ethylhexanoic acid and 99.25 percent of water; the 53,360 g of ethylhexanoic acid are 1,300 times the amount required for the removal of the water.

The acid mixture at the base of the column contains 0.2 percent of water and is distilled in column 11 as described in Example 1 at a pressure of 50 mm of Hg to separate the water and the acetic acid. The base of this column is heated at 120° C and the acid mixture is added at a height of 1,000 mm, whilst a further 5,720 g of 2-ethylhexanoic acid are added at a height of 2,700 mm. At a reflux ratio of 14:1 and an overhead temperature of 41.5° C there are obtained as distillate 826 g of an acetic acid having a purity of 82.2 percent and containing 2 percent of acrylic acid and 0.2 percent of 2-ethylhexanoic acid. The content of acetic acid is equivalent to a yield of 83.4 percent based on the acetic acid in the original solution.

The acid mixture withdrawn from the base of column 11 contains 0.04 percent of acetic acid.

The acrylic acid is distilled off in column 18 as described in Example 1, the acid mixture being fed thereto at a height of 1,000 mm. The column is operated at a pressure of 45 mm of Hg, a base temperature of 156.5° C, a reflux ratio of 1.5:1 and an overhead temperature of 64.5° C to give 9,190 g of distillate containing 98.2 percent of acrylic acid, 1.4 percent of water, 0.3 percent of acetic acid and 0.1 percen of stabilizer. This is equivalent to a yield of 96.1 percent based on the acrylic acid contained in the original solution.

The 2-ethylhexanoic acid obtained at the base of column 18 is further distilled in column 24 as described in Example 1, at a pressure of 35 mm of Hg, a base temperature of 151.5° C, an overhead temperature of 109° C and a reflux ratio of 2:1, to give 780 g of maleic anhydride having a purity of 90.6 percent. This is equivalent to a yield of 86 percent based on the maleic acid present in the original solution. The maleic anhydride contains 8.4 percent of acrylic acid and 1 percent of 2-ethylhexanoic acid. The 2-ethylhexanoic acid obtained at the base is recycled to the process.

We claim:

1. In a process for recovering acrylic acid from an aqueous solution containing from 10 to 80 percent by weight of acrylic acid, 20 to 80 percent water and by-products of the propylene oxidation process selected from the group consisting of acetic acid, maleic acid and maleic anhydride, the improvement comprising: distilling off water from said aqueous solution azeotropically in a distillation column while adding an amount of a hydrophobic organic solvent which is from 100 to 5,000 times greater than that required for the azeotropic removal of the water, which hydrophobic organic solvent boils at higher temperatures than acrylic acid, does not form azeotropes with said acids and maleic anhydride and, under the conditions of the azeotropic distillation, boils at least 20° C higher than maleic anhydride up to 300° C and withdrawing the acrylic acid and the bulk of the hydrophobic organic solvent from the bottom of said column.

2. A method as in claim 1 wherein said aqueous solution contains from 1 to 5 percent by weight of maleic acid.

3. A method as in claim 1 wherein said aqueous solution contains from 40 to 80 percent by weight of water.

4. A method as in claim 3 wherein said aqueous solution contains from 15 to 60 percent by weight of acrylic acid.

5. A method as in claim 4 wherein the amount of hydrophobic organic solvent is 120 to 4,000 times what is required for the azeotropic removal of the water.

6. A method as in claim 1 wherein said organic solvent is selected from the group consisting of adipic acid dinitrile, 2-ethylhexanoic acid, dimethyl and dibutyl phthalates, tributyl phosphate, diphenyl ether, diphenyl and mixtures thereof.

7. A method as in claim 1 wherein said organic solvent contains dimethyl phthalate.

8. A method as in claim 1 wherein said organic solvent contains adipic acid dinitrile.

9. A method as in claim 1 wherein said organic solvent is a mixture of diphenyl ether and diphenyl.

10. A method as in claim 1 wherein said organic solvent contains di-n-butyl phthalate.

11. A method as in claim 1 wherein said organic solvent contains tri-n-butyl phosphate.

12. A method as in claim 1 wherein said organic solvent contains 2-ethylhexanoic acid.

* * * * *